March 17, 1936. A. H. MITTAG 2,034,524
ELECTRIC VALVE CONVERTING SYSTEM AND EXCITATION APPARATUS THEREFOR
Filed Aug. 25, 1933
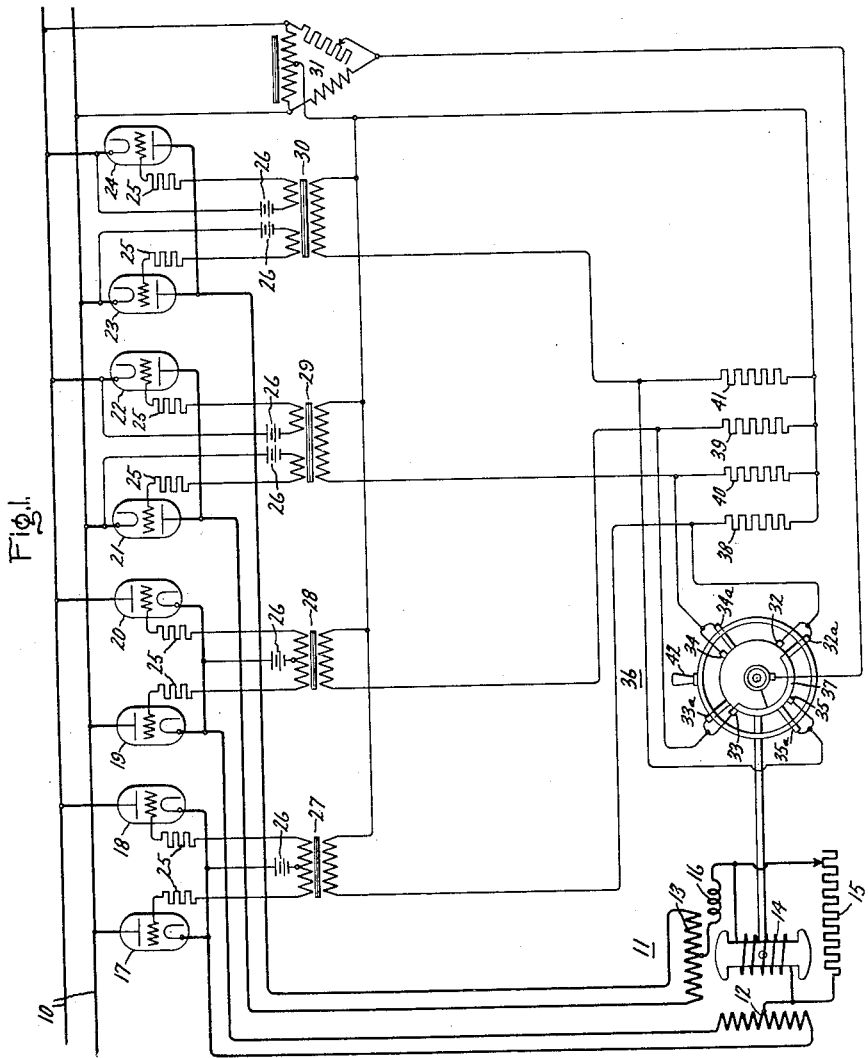
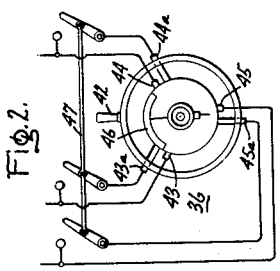
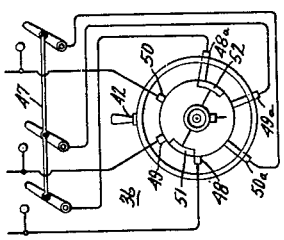
Inventor:
Albert H. Mittag,
by Harry E. Dunham
His Attorney.

Patented Mar. 17, 1936

2,034,524

UNITED STATES PATENT OFFICE 2,034,524

ELECTRIC VALVE CONVERTING SYSTEM AND EXCITATION APPARATUS THEREFOR

Albert H. Mittag, Schenectady, N. Y., assignor to General Electric Company, a corporation of New York Application August 25, 1933, Serial No. 686,751

17 Claims. (Cl. 172—274)

My invention relates to electric valve converting systems and more particularly to new and improved apparatus for exciting the control elements of the electric valves of such converting systems.

Heretofore there have been devised numerous electric valve converting systems for transmitting energy between direct and alternating current circuits, direct current circuits of different voltages, or independent alternating current circuits of the same or different frequencies. Many of these systems have included a distributor apparatus provided with a plurality of brush and segment elements effective to render conductive the several electric valves in a predetermined sequence to transfer the current between the several terminals of the load circuit of the system. In case the load circuit of the apparatus constitutes a single alternating current motor it is customary to drive the distributor apparatus from the motor, while if the load circuit is an independent distribution circuit, the distributing apparatus may be driven by an auxiliary motor at a speed dependent upon the frequency which it is desired to supply to the load circuit. Particularly in the case when such a distributor apparatus is driven by the motor which constitutes the load circuit of the system, it is essential that the live segment of the distributor is of exactly the right length relative to the spacing of the brushes so that a segment will leave contact with a particular brush just as it makes contact with the succeeding brush. If there is a space in which neither brush makes contact with the live segment of the distributor, this becomes a "dead spot" in which the motor cannot be started from rest. On the other hand, if the overlap during which both brushes are in contact with a live segment of the distributor is greater than a certain amount, it interferes materially with the commutation of the current between the several electric valves.

This is particularly true in the case of a motor energized from an alternating current supply circuit. Under starting and low speed operating conditions, the commutation of the current between the valves is effected by the supply frequency, that is, by the supply voltage periodically falling to zero, and the question of overlapping of the brush contacts of the distributor segments is relatively unimportant. At higher speeds, however, the counter-electromotive force generated by the motor is the principal factor in the commutation of current between the electric valves and the complete transfer of the current between the valves must be effected within a definite commutating angle referred to the load current, or it cannot be completed at all. Under these conditions it is very important that there should not be excessive overlap in the contacting periods of the brushes controlling the valves between which the current is to be commutated.

It is an object of my invention, therefore, to provide an improved electric valve converting system and an excitation apparatus therefor which will overcome the above-mentioned disadvantages of the arrangements of the prior art and which will be simple and reliable in operation.

It is another object of my invention to provide an improved electric valve converting system and a control distributor apparatus therefor which will facilitate the commutation of current between several electric valves under various operating conditions of the system.

It is a further object of my invention to provide an improved electric valve converting system and a control distributor apparatus therefor, which will eliminate dead spots on the distributor and which will, at the same time, avoid any overlapping of the brush and segment elements under normal operating conditions of the system.

It is a still further object of my invention to provide an improved method of operating an electric valve converting system for transmitting energy from an alternating current supply circuit to an alternating current load circuit and including a distributor apparatus, which will prevent the occurrence of any dead spots in the operation of the system, and which will at the same time facilitate the commutation of current between the valves under various operating conditions.

In accordance with one embodiment of my invention, each of the terminals of a load circuit is interconnected with the several terminals of a supply circuit through a group of one or more electric valves. There is also provided a distributor apparatus provided with a brush and segment element for each group of electric valves, the distributor being driven at a speed corresponding to the frequency which it is desired to supply to the load circuit. For example, if the load circuit comprises a single electric motor the distributor may be driven directly from the motor. Instead of providing a single brush for each group of valves, a pair of brushes are provided slightly displaced in a space phase and the brushes of each pair may be shifted relative to each other to adjust the effective lengths of contact of the brush and segment elements or they may be selectively connected or disconnected to produce a similar result.

For a better understanding of my invention, together with other and further objects thereof, reference is had to the following description taken in connection with the accompanying drawing, and its scope will be pointed out in the appended claims. In the drawing, Fig. 1 diagrammatically illustrates an electric valve converting system for transmitting energy from a single phase alternating current supply circuit to a quarter phase motor and including my improved distributor apparatus, while Figs. 2 and 3 show modified forms of my improved distributor apparatus.

Referring now more particularly to Fig. 1 of the drawing, there is illustrated an arrangement for transmitting energy from a single phase alternating current supply circuit 10 to a quarter phase alternating current motor 11 of the synchronous type, comprising armature phase windings 12 and 13, and a rotatable field winding 14. The field winding 14 may be connected in series with the armature windings, as illustrated, in case it is desired to give the motor series characteristics, or in case shunt characteristics are desired, the field winding may be separately excited in any well known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed-torque characteristics of the motor, in which case it is preferable also to include a reactor 16 in series with a parallel connected winding 14 and resistor 15.

The terminals of the armature phase winding 12 are connected to the supply circuit through two groups of similarly connected electric valves 17 and 18, and 19 and 20, respectively. Similarly, the armature phase winding 13 is connected to the supply circuit 10 through two groups of electric valves 21 and 22, and 23 and 24, connected to the circuit 10 with a polarity opposite to that of electric valves 17-20, inc. Each of the electric valves 17-24, inc., is provided with an anode, a cathode and a control electrode or grid and may be of any of the several types well known in the art, although I prefer to use valves of the vapor or gaseous electric discharge type.

In order to control the conductivity of the several electric valves, the grids of the pairs of valves 17—18, 19—20, etc., are connected to their respective cathodes through current limiting resistors 25, negative bias batteries 26 and secondary windings of the grid transformers 27, 28, 29 and 30, respectively, although in some instances, the negative bias batteries 26 may be satisfactorily omitted. The primary windings of the grid transformers 27-30, inc., are excited from the alternating current supply circuit 10 through any suitable phase adjusting means, such as an impedance phase shifting circuit 31, and brushes 32-35, inc., respectively, of a distributor mechanism 36. The distributor 36 is provided with a single conductive segment 37 driven directly by the rotating member 14 of the motor 11. The resistors 38-41, inc., are preferably connected across the primary windings of the grid transformers 27-30, inc., respectively, to stabilize or stiffen the grid circuits and to provide a discharge path for the leakage reactance of the grid transformers.

The contact segment 37 is preferably of a length somewhat less than 180 electrical degrees, referred to the motor 11, so that, taking into consideration the width of the brushes, not more than one pair of electric valves of the groups between which current is commutated, is excited from the distributor mechanism 36 at any given instant. The distributor mechanism 36 is also provided with a plurality of auxiliary brushes 32a-35a electrically connected to the main brushes 32-35, inc., respectively, and normally displaced from the main brushes by a relatively small angle. These auxiliary brushes 32a-35a, inc., are connected to a brush shifting yoke 42 for purposes to be explained hereinafter.

The general principles of operation of the above described apparatus for transmitting energy from the alternating current circuit 10 to the motor 11 will be well understood by those skilled in the art, or will be found explained in detail in United States Letters Patent No. 1,937,377, granted November 28, 1933 upon an application of E. F. W. Alexanderson, and assigned to the same assignee as the present application. The Alexanderson patent discloses and broadly claims the above described power circuit, as well as the feature of selectively energizing the grids of the several electric valves from a source of alternating potential through a commutating device. Assuming that the motor field winding 14 and the distributor mechanism 36 are substantially in the positions illustrated and that the phase shifting circuit 31 is so adjusted that the potentials impressed upon the primary windings of the several transformers 27-30, inc., are substantially in phase with the potential of the alternating current circuit 10, it will be seen that the primary windings of the grid transformers 28 and 30 are excited through their associated brushes 33 and 35, respectively, to render conductive the pairs of electric valves 19 and 20, and 23 and 24. These two groups of electric valves, 19 and 20, and 23 and 24, comprise a full wave rectifying circuit of which the unidirectional load circuit comprises the upper half of the armature winding 12, the field winding 14, reactor 16 and the right-hand portion of the motor armature winding 13. The resultant magneto-motive force produced by the current flowing in armature windings 12 and 13 will be in such a direction as to exert a torque upon the motor field 14 and initiate a rotation of the motor, which, it will be assumed, is in a clockwise direction.

When the motor 11 has rotated through approximately 90 electrical degrees, the grid transformer 30 will be deenergized at the brush 35 and the grid transformer 29 will be excited through the brush 34 of the distributor mechanism. The result is that the group of valves 23—24 becomes non-conducting and the pair of valves 21—22 becomes conductive to transfer current from the right-hand portion to the left-hand portion of the armature winding 13. The armature magnetomotive force of the motor 11 is thus advanced 90 electrical degrees and a torque is produced on the motor field 14 to rotate it through an additional 90 degrees. In this manner current is successively commutated between the several terminals of the armature windings 12 and 13 to produce a rotating magneto-motive force and a rotation of the motor 11. The distributor mechanism 36 is effective to excite only those valves connected to the terminals of the armature windings which are in a positive torque producing position with respect to the motor field 14 at any particular instant.

In the above explanation, the auxiliary brushes 32a–35a, inc., have been disregarded. If the distributor disc of the mechanism 36 had stopped in a position a few degrees in advance of the position illustrated so that contact at the brush 33 were broken without completing that at the brush 32, it is seen that the only pair of electric valves to be excited would be the valves 23 and 24, which are excited through the brush 35. This would not provide a complete path across the supply circuit 10 with the result that no current would flow in the armature windings 12 and 13 and the apparatus would be on a "dead spot". With the addition of the auxiliary brushes 32a–35a, inc., however, if the distributor disc were rotated counter-clockwise through a small angle, as assumed, although contact would not be made at the brush 32 it would be made at the brush 32a, which is electrically interconnected with the brush 32, resulting in the exciting of the electric valves 17 and 18, which, with electric valves 23 and 24 would provide for the energization of the motor 11 as described above. Thus the occurrence of a dead spot is thus avoided. With the addition of the auxiliary brushes there is always a certain overlap; that is, a certain period during which both pairs of electric valves between which the current is commutated, are rendered conductive simultaneously. Under starting conditions or low speed operating conditions of the motor, this slight overlap is not important, as the commutation is effected by the supply voltage; that is, the current in any particular pair of electric valves will be extinguished at the end of the particular half cycle of supply current.

At higher operating speeds, however, particularly when approaching synchronism, the supply voltage is no longer effective to commutate the current between electric valves which, in the particular system illustrated, is accomplished by the counter-electromotive force generated by the rotation of the field member 14. With this type of commutation, there is a very definite limit to the time during which the transfer of current between the successive pairs of electric valves may be effected; that is, to the commutating angle. If current persists in the outgoing electric valve after this instant, the current cannot be interrupted at all and a short circuit results. Therefore, under these operating conditions it is important that there should be an inappreciable overlap, or preferably that the excitation to one group of valves should actually be cut off before it is supplied to the succeeding group of valves. Under these conditions current will continue to flow in the first pair of valves, however, if valves of the vapor or gaseous discharge type are utilized, because of the inability of the grid circuit to interrupt normal current in the valves. This result may be secured by operating the yoke 42 to shift the auxiliary brushes 32a–35a until they are in phase coincidence with the main brushes 32–35, inc., and thus completely ineffective. Under these conditions the motor may be operated up to and beyond synchronism and the current will be commutated between the several electric valves in a normal manner.

In Fig. 2 is shown a modified form of the distributor mechanism 36 suitable for controlling the valves of a converting apparatus connected to a three phase alternating current load circuit or alternating current motor. In this case the distributor comprises three main brushes 43, 44 and 45 and three auxiliary brushes 43a, 44a and 45a, respectively, and a single rotating segment 46 substantially less than 120 electrical degrees in length. With 120 electrical degrees spacing between the main brushes 43, 44 and 45, it is clear that there is no overlap between the contacting periods of the several brushes, but that there is a dead spot of an appreciable width. Under starting and low speed operating conditions, however, the auxiliary brushes 43a, 44a and 45a are connected to their respective main brushes through a three pole switch mechanism 47. Under higher speed operating conditions the switch mechanism 47 may be opened to produce an effect equivalent to the shifting of the brushes in the arrangement shown in Fig. 1. Thus, the relationship between the brushes of each pair may be modified either by adjusting their phase relation or by changing their electrical interconnections. If desired, of course, phase adjustment between the main and auxiliary brushes may be provided through the brush shifting yoke 42 in which the auxiliary brushes are mounted.

In Fig. 3 is shown a still further modification of the distributor apparatus 36 suitable for application to a four pole, three phase motor. In this case the main brushes 48, 49 and 50 are displaced 60 mechanical degrees or 120 electrical degrees, and a rotating element is provided with two contact segments 51 and 52, each somewhat less than 60 mechanical degrees and diametrically spaced. The auxiliary brushes 48a, 49a and 50a are spaced substantially diametrically opposite to the main brushes 48, 49 and 50, respectively, but are displaced from the diametrical position by an angle substantially equal to the angle between the main and auxiliary brushes of the arrangement of Fig. 2. As in the previous arrangement, under starting conditions the switch mechanism 47 is operated to connect the main and auxiliary brushes and thus increase the effective lengths of the segments, while at higher speeds, the switch 47 is opened. It will be seen that, if the brush shifting yoke 42 is operated to place the auxiliary brushes diametrically opposite the main brushes, the result is the equivalent of shifting the auxiliary brushes of the apparatus shown in Figs. 1 and 2 directly in phase coincidence with the main brushes, since, in the distributor of Fig. 3 the contact segments are diametrically opposite.

In the apparatus shown in the figures and described above, the distributor apparatus is illustrated as having a stationary brush, or pair of brushes, for each of the terminals of the load circuit, or motor, and a rotating contact segment for each pair of poles of the motor from which the distributor is driven. It will be well understood, however, that the brush mechanism may be rotatable and the contact segment stationary; or that a single brush may cooperate with a pair of segments, the relationship between which may be modified by adjusting their phase or their electrical connection; or that a single brush, or pair of brushes, may be provided for each pair of poles of the motor and a plurality of segments, one for each terminal of the load circuit, all of which are well known mechanical equivalents, all without departing from my invention. In its broadest aspects my invention comprises the use of a brush and segment element for each terminal of the load circuit per pair of poles. By the term "brush and segment element" is meant the combination of a single segment and a main and auxiliary brush or a single brush and a main and auxiliary segment.

While I hve described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a controlled electric valve converting system, apparatus for exciting the control elements of the valves of the system in a predetermined sequence comprising a source of control potential, a distributor provided with a plurality of brush and segment elements interconnecting said source and said control elements, and means for varying the effective length of contact of said brush and segment elements.

2. In a controlled electric valve converting system, apparatus for exciting the control elements of the valves of the system in a predetermined sequence comprising a source of control potential, a distributor provided with a plurality of brush and segment elements interconnecting said source and said control elements, and means for varying the effective length of the segment elements.

3. In a controlled electric valve converting system, apparatus for exciting the control elements of the valves of the system in a predetermined sequence comprising a source of control potential, a distributor provided with a segment of an angular length less than the conductive period of the valve controlled thereby and with a plurality of brushes interconnecting said source and said control elements, and means for modifying the action of said brushes to extend the effective length of said segment.

4. In a controlled electric valve converting system, apparatus for exciting the control elements of the valves of the system in a predetermined sequence comprising a source of control potential, a distributor provided with a plurality of pairs of brushes, the brushes of each pair being interconnected and interconnecting said source and said control elements, and means for moving the brushes of each pair relative to each other around said distributor.

5. In a controlled electric valve converting system, apparatus for exciting the control elements of the valves of the system in a predetermined sequence comprising a source of control potential, a distributor provided with a plurality of fixed brushes and a similar number of movable brushes, corresponding fixed and movable brushes being interconnected and interconnecting said source and said control elements, and means for shifting said movable brushes with respect to said fixed brushes around said distributor.

6. In a controlled electric valve converting system, apparatus for exciting the control elements of the valves of the system in a predetermined sequence comprising a source of control potential, a distributor provided with a plurality of pairs of brushes, the brushes of each pair being similarly displaced angularly upon said distributor, and means for selectively exciting the control elements from said source through one or both brushes of each pair.

7. In a controlled electric valve converting system, apparatus for exciting the control elements of the valves of the system in a predetermined sequence comprising a source of control potential a distributor provided with a plurality of segments and pairs of brushes, circuits for energizing said control elements from said source through one the brushes of each pair, and switch means for interconnecting the brushes of each pair to modify the effective length of said segment.

8. In a controlled electric valve converting system for transmitting energy from a supply circuit to a load circuit provided with a plurality of terminals, said system including a plurality of valves interconnecting said supply circuit with the several terminals of said load circuit, apparatus for exciting the control elements of the valves to render said valves conductive in a predetermined sequence comprising a source of control potential, a distributor provided with a brush and segment element for the valves associated with each of said terminals for exciting said control elements from said source, and means for varying the effective length of contact of each of said brush and segment elements.

9. In a controlled electric valve converting system for transmitting energy from a supply circuit to a load circuit including $m$ terminals and an alternating current motor having $n$ pairs of field poles, said system including a plurality of valves interconnecting said supply circuit with the several terminals of said load circuit, apparatus for exciting the control elements of the valves to render said valves conductive in a predetermined sequence comprising a source of control potential, a distributor adapted to be driven by said motor and provided with $n$ segments and $m$ pairs of brushes interconnecting said control elements and said source, and means for modifying the action of said brushes to extend the effective length of said segments.

10. In a controlled electric valve converting system for transmitting energy from a supply circuit to a load circuit including $m$ terminals and an alternating current motor having $n$ pairs of field poles, said system including a plurality of valves interconnecting said supply circuit with the several terminals of said load circuit, apparatus for exciting the control elements of the valves to render said valves conductive in a predetermined sequence comprising a source of control potential, a distributor adapted to be driven by said motor and provided with $n$ segments and $m$ pairs of brushes interconnecting said control elements and said source, and means for moving the brushes of each pair relative to each other to increase the effective length of said segments.

11. In a controlled electric valve converting system for transmitting energy from a supply circuit to a load circuit including $m$ terminals and an alternating current motor having $n$ pairs of field poles, said system including a plurality of valves interconnecting said supply circuit with the several terminals of said load circuit, apparatus for exciting the control elements of the valves to render said valves conductive in a predetermined sequence comprising a source of control potential, a distributor adapted to be driven by said motor and provided with $n$ segments and $m$ pairs of brushes, the brushes of each pair being displaced by a relatively small angle, circuits for exciting said control elements from said source through a brush of each of said pairs, and switch means for interconnecting the brushes of each pair to extend the effective length of said segments.

12. In a controlled electric valve converting system for transmitting energy from a supply circuit to a load circuit including $m$ terminals and an alternating current motor having two pairs of field poles, said system including a plurality of valves interconnecting said supply circuit with the several terminals of said load circuit, apparatus for exciting the control elements of the valves to render said valves conductive in a predetermined sequence comprising a source of control potential, a distributor adapted to be driven by said motor and provided with two segments and $m$ pairs of brushes, said segments being displaced substantially 180° and the brushes of each pair being displaced by an angle slightly less than 180°, circuits for exciting the control elements from said source through a brush of each of said pairs, and switch means for interconnecting the brushes of each pair to extend the effective length of said segments.

13. In combination, a supply circuit, a load circuit provided with a plurality of terminals, a plurality of electric valves interconnecting said supply circuit and the several terminals of said load circuit, each of said valves being provided with a control element, a source of potential for exciting said control elements, a distributor provided with a plurality of brush and segment elements interconnecting said source and said control elements, and means for varying the effective length of contact of said brush and segment elements.

14. The method of operating an electric valve converting system for transmitting energy from an alternating current supply circuit to an alternating current load circuit provided with $n$ terminals in which each terminal is interconnected with said supply circuit through one or more controlled electric valves, which comprises successively rendering conductive the valves associated with each terminal for a predetermined fraction of a cycle with respect to said load circuit when the frequency of said load circuit is relatively low with respect to that of said supply circuit, and decreasing the periods during which said valves are rendered conductive for higher frequencies of said load circuit.

15. The method of operating an electric valve converting system for transmitting energy from an alternating current supply circuit to an alternating current load circuit provided with $n$ terminals in which each terminal is interconnected with said supply circuit through one or more controlled electric valves, which comprises successively supplying excitation to the control elements of the valves associated with each terminal for a predetermined fraction of a cycle with respect to said load circuit when the frequency of said load circuit is relatively low with respect to that of said supply circuit, and decreasing the periods of excitation to the control elements of said valves for higher frequencies of said load circuit.

16. The method of operating an electric valve converting system for transmitting energy from an alternating current supply circuit to an alternating current motor provided with $n$ terminals in which each terminal is interconnected with said supply circuit through one or more controlled electric valves, which comprises successively rendering conductive the valves associated with each terminal for a predetermined fraction of a cycle with respect to the load circuit when said motor is operating at relatively low speeds, and decreasing the periods during which said valves are rendered conductive for higher frequencies of said load circuit.

17. In a controlled electric valve converting system, apparatus for exciting the control elements of the valves of the system in a predetermined sequence comprising a source of control potential, a distributor including a disc having one or more conductive segment contact elements, one or more brush contact elements cooperating therewith, said segment elements and said brush elements being relatively rotatable and said brush and segment elements interconnecting said source and said control elements, and means for modifying the relationship between similar contact elements to vary the effective length of contact of each brush and segment element.

ALBERT H. MITTAG.